W. A. Lighthall,
Steam-Boiler Condenser.
No. 31,609. Patented Mar. 5, 1861.
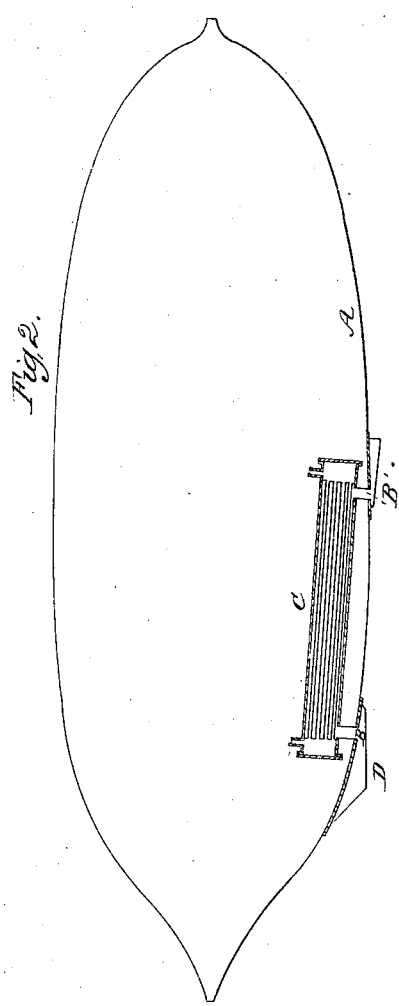
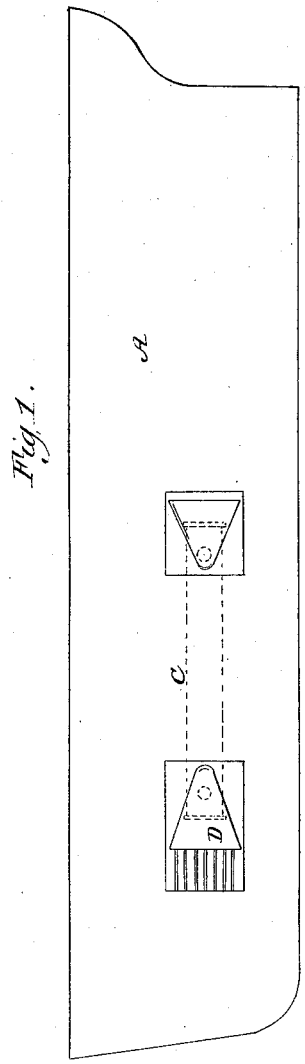
Witnesses.
Inventor.

UNITED STATES PATENT OFFICE.

WILLIAM A. LIGHTHALL, OF NEW YORK, N. Y.

METHOD OF SUPPLYING WATER TO STEAM VESSELS FOR THE PURPOSE OF CONDENSING STEAM OR COOLING WATER.

Specification of Letters Patent No. 31,609, dated March 5, 1861.

*To all whom it may concern:*

Be it known that I, WILLIAM A. LIGHTHALL, of the city, county, and State of New York, have invented a new and Improved Arrangement of Means of Supplying Water to Steam Vessels, for the Purpose of Condensing Steam or Cooling Hot Water; and I do hereby declare that the following is a full and exact description of the same, reference being had to the accompanying drawings, and to the letters of reference marked thereon, in which—

Figure 1 is a side elevation of a vessel showing the position of the apertures in it for the entrance and exit of the cooling water, and the hoods or covers to the apertures to induce the requisite circulation of the water, and Fig. 2 a horizontal section taken at the line of the height of the center of the apertures.

My invention relates to an arrangement for supplying water to a steam vessel for the purpose of condensing the steam in a surface condenser, or for cooling the injection water of its condensing engine where it is desired to re-use the injection water after being passed through the condenser, and it consists in forcing a current of the external water through one aperture in the side of the vessel into the condenser or cooler, and passing it from the condenser or cooler out through another similar aperture by the motion of the vessel, passing through the water, through the use of hooded covers to the apertures, as hereinafter described.

A is the side of the vessel, through which is made at the points required the apertures B, B'; the first one for the purpose of admitting the external water into the vessel to pass through the condenser or cooler C, and the latter for the exit of that water from the vessel. The first is covered by the hood D, opening toward the stern of the vessel, the mouth of which is guarded as shown (or by other suitable means) to prevent articles entering the aperture to choke it, and which guides and forces the water into the aperture by the forward movement of the vessel. The latter is covered by a similar hood opening toward the stern of the vessel, the passage of which through the water creates a vacuum as the vessel moves ahead which causes an increased circulation of the water through the apertures and through the condenser or cooler.

The apertures B, B', may be on a line of height with each other, or the exit aperture B' may be placed enough higher than the entrance aperture B, to allow the water to circulate through the apertures and through the condenser or cooler C when the vessel is stationary, from the exit water being of a higher temperature than the external water and therefore lighter in bulk.

The advantages of my improvement are that the hooded covers D, D', arranged as shown, insure the entrance to and exit from the condenser or cooler of a proper supply of external water with greater certainty than if the supply was received from the bow and passed out at the stern of the vessel through the mouths of the pipes alone; and that it permits the condenser or cooler to be connected to the apertures in the side of the vessel by short pipes which are not as liable to be damaged or broken (to the danger of sinking the vessel) as the pipes leading from the bow of the vessel to the condenser or cooler, and from it to the stern, as shown in the other arrangements devised for the same purpose.

What I claim as my invention and desire to secure by Letters Patent is—

The arrangement of the hoods D. D', constructed as shown, in their relation to the condenser or cooler C. and the vessel A. as described and for the purpose set forth.

WM. A. LIGHTHALL.

Witnesses:
  S. B. ELLITHORP,
  FRANCIS S. LOW.